Figures 6, 7:
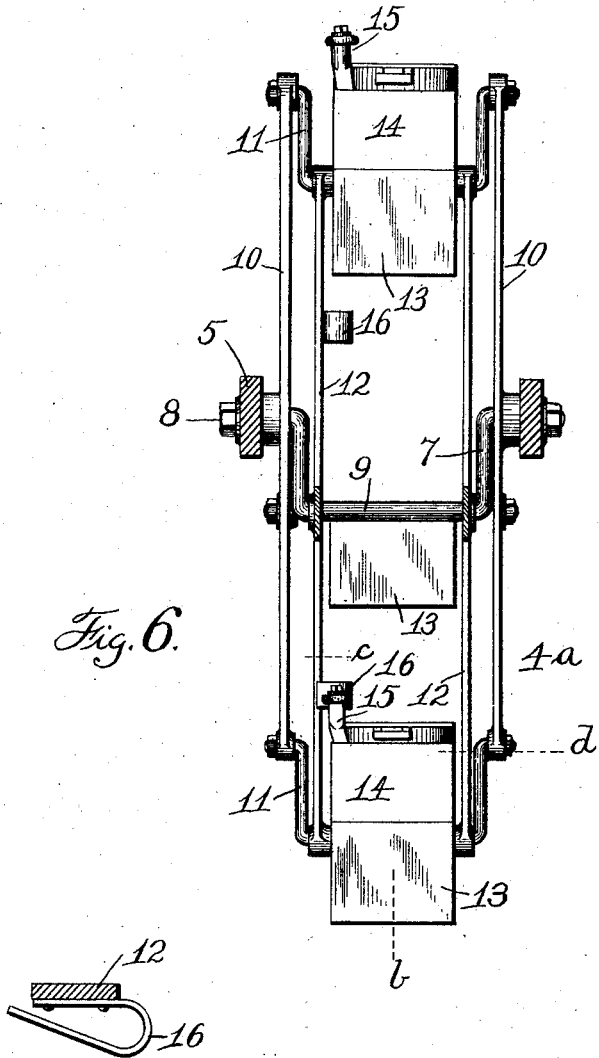

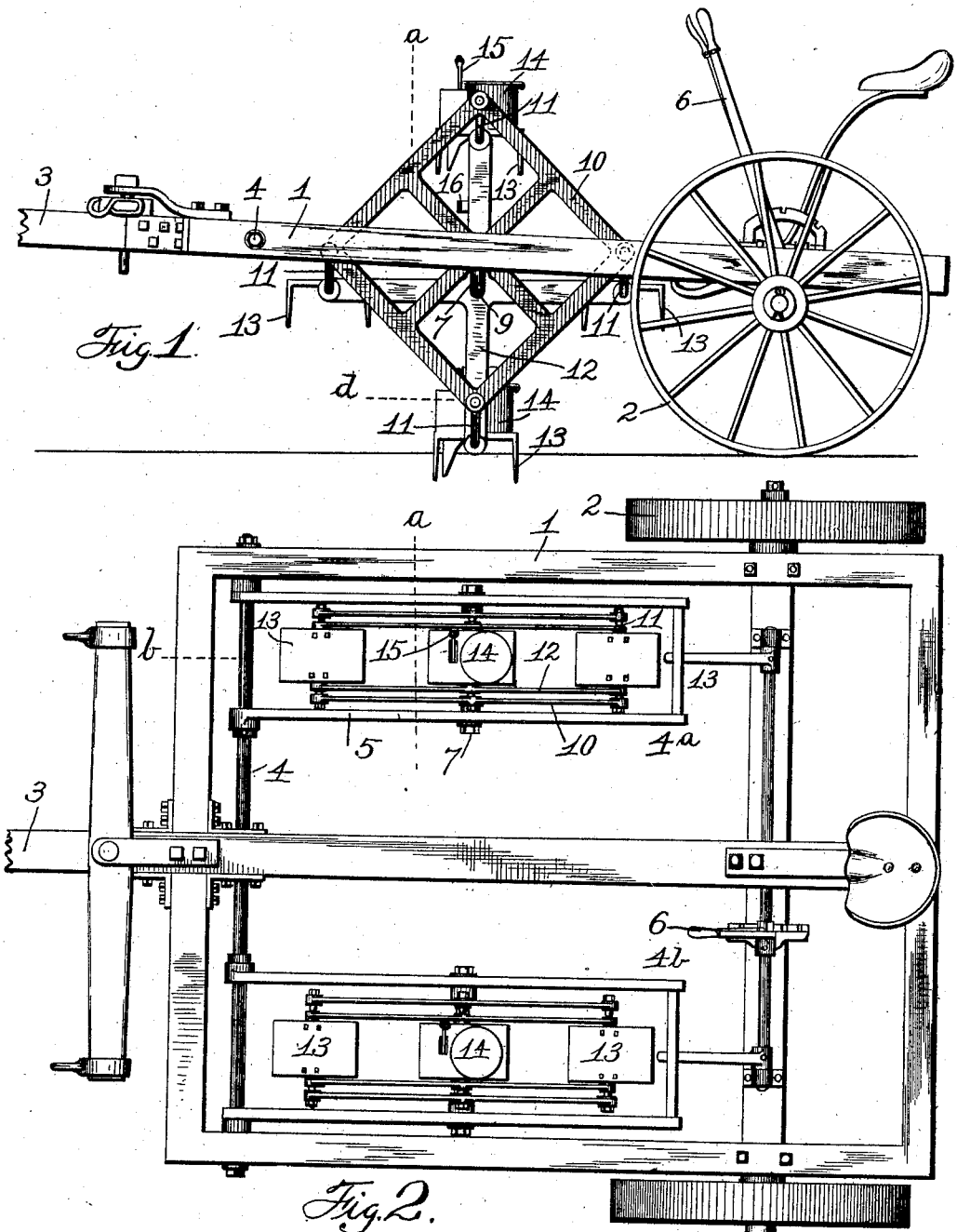

No. 859,536. PATENTED JULY 9, 1907.
W. H. ALBERT.
CHECK ROW SEEDER AND PLANTER.
APPLICATION FILED APR. 26, 1907.
3 SHEETS—SHEET 2.
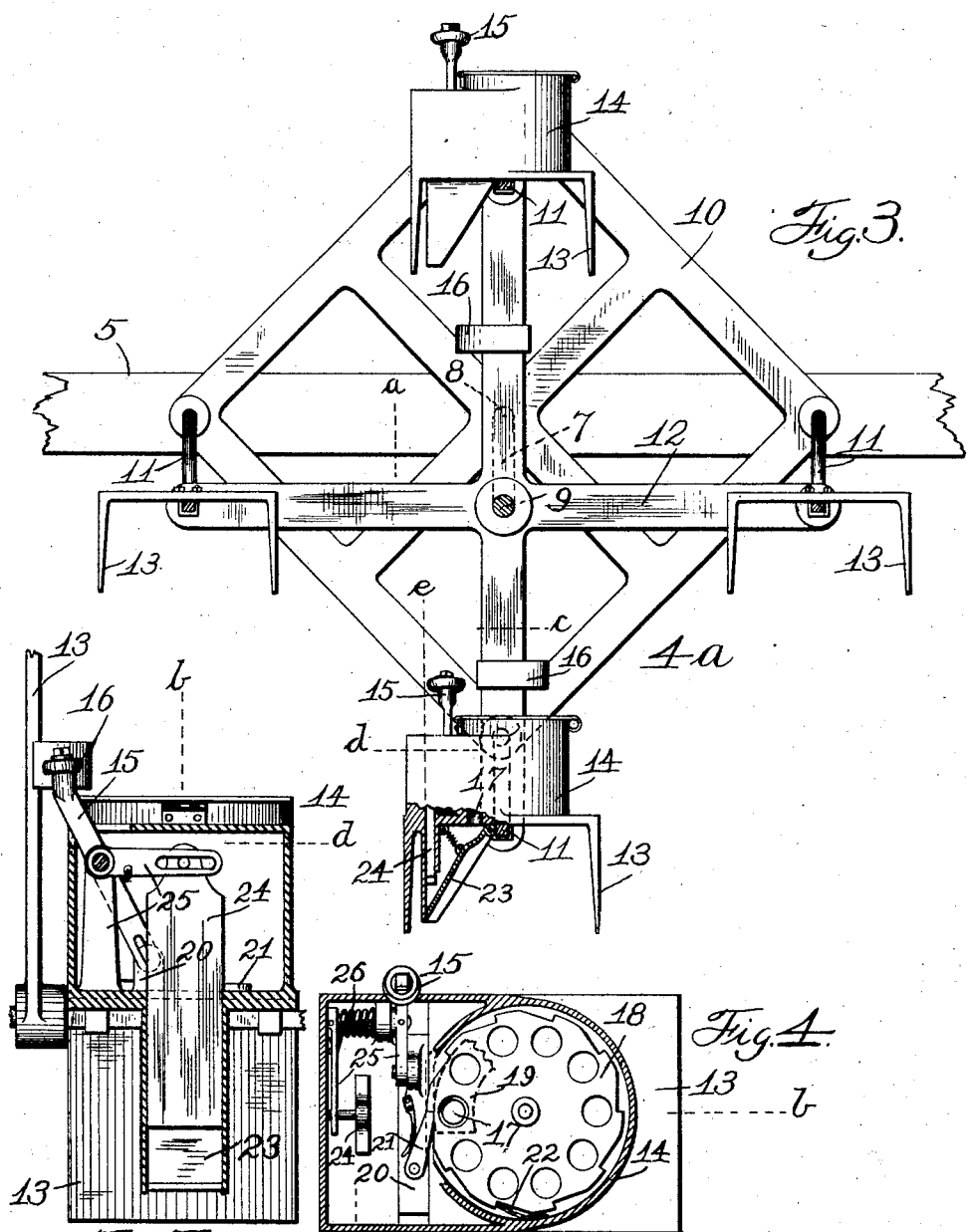
Witnesses:
Elmer R. Shipley.
M. S. Belden
William H. Albert
Inventor
by James W. See
Attorney No. 859,536. PATENTED JULY 9, 1907.
W. H. ALBERT.
CHECK ROW SEEDER AND PLANTER.
APPLICATION FILED APR. 26, 1907.

3 SHEETS—SHEET 3.

Witnesses:
Elmer R. Shipley.
M. S. Belden.

William H. Albert
Inventor
by James W. See
Attorney

UNITED STATES PATENT OFFICE.

WILLIAM H. ALBERT, OF BURROWS, INDIANA, ASSIGNOR OF ONE-HALF TO JOHN A. McGREEVY, OF BURROWS, INDIANA.

CHECK-ROW SEEDER AND PLANTER.

No. 859,536.     Specification of Letters Patent.     Patented July 9, 1907.

Application filed April 26, 1907. Serial No. 370,389.

To all whom it may concern:

Be it known that I, WILLIAM H. ALBERT, a citizen of the United States, residing at Burrows, Carroll county, Indiana, have invented certain new and useful Improvements in Check-Row Seeders and Planters, of which the following is a specification.

This invention, relating to wireless check row seeders and planters will be readily understood from the following description taken in connection with the accompanying drawing in which:—

Figure 1 is a side elevation of a machine embodying an exemplification of my invention: Fig. 2 a plan of the same: Fig. 3 a vertical section in the plane of line $b$ of Figs. 2, 4, 5 and 6. Fig. 4 a horizontal section of one of the seed boxes in the plane of line $d$ of Figs. 1, 3, 5 and 6: Fig. 5 a vertical section of one of the seed boxes in the plane of line $e$ of Figs. 3 and 4: Fig. 6 a vertical section in the plane of line $a$ of Figs. 1, 2 and 3: and Fig. 7 a horizontal section in the plane of line $c$ of Figs. 3 and 6. Figs. 1 and 2 are on a smaller scale than the remaining figures.

The machine will, of course, as a general thing, be arranged to plant two rows at once, and it is so illustrated in the drawings, but as the apparatus pertaining to one seed-row is a duplicate of that pertaining to the other row, it will be sufficient to describe the details of such apparatus in the singular.

In the drawings:—1, indicates the frame of the planter: 2, carrying wheels therefor: 3, the tongue: 4, a pivot-bar disposed across the frame: 4ª, one of the check rowing and seeding devices, considered as a whole: 4ᵇ, the other check rowing and seeding device, these two devices being carried along over the field by the frame at such distance apart as corresponds with the desired distance between the seed rows, description being hereafter generally confined to a single one of these check rowing and seeding devices: 5, a pair of drag-bars having their forward ends pivoted to pivot-bar 4 so that their rear portions are capable of freely rising and falling, this pair of drag bars constituting dragging frame bars of one of the check-rowing and seeding devices: 6, a lifting device, of obvious construction and operation, carried by the general frame of the machine and serving in lifting the check rowing and seeding devices and holding them up to inactive position: 7, a crank or bail extending across between the drag-bars 5 and constituting an upper pivot-axis and a lower pivot-axis, this bail being fixed in the drag-bars so as to be incapable of rotary or swinging motion:
8, the upper member of the bail, rigidly fixed in the drag-bars and representing the upper pivot axis of the bail: 9, the lower member of the bail, representing its lower pivot axis: 10, a pair of rectangular frames freely pivoted on the upper member of the bail 7: 11, a bail at each corner of the frame 10, which frame 10 will be hereafter referred to as the main pivot frame, these bails stretching across between the two side members of the main pivot frames 10, the upper members of the bails being freely pivoted in pivot bearings in the corners of the main pivot frame, the bails hanging downward, their lower members forming pivot-axes, and the vertical length of these bails being the same as that of bail 7: 12, a pair of cross-shaped secondary frames having their centers freely pivoted on the lower member 9 of main bail 7, the outer ends of these secondary frames having pivot-bearings freely journaled on the lower members of the secondary bails 11: 13, a pair of downwardly projecting double spades rigidly fixed to the lower member of each of the secondary bails 11, the blades of these spades standing at right angles to the path of travel of the machine: 14, a seed box carried on the alternate ones of the spades: 15, a lever carried by each seed box for actuating the seeding mechanism therein: 16, cams carried by the secondary pivot frame 12 in position to engage and actuate the seeding levers 15: 17, a seed discharge hole through the floor of each seed box to permit downward delivery of the seed between the blades of the spades: 18, a seed disk of usual construction arranged for intermittent rotation on the floor of each seed box and having a circumferential series of holes to carry grains to the seed discharge hole 17: 19, the usual fender or cutoff, shown in dotted lines, disposed over the seed disk at the seed discharge hole 17 and preventing the movement of grains from the seed box through the discharge hole except as the grains are carried forward and under the fender by the usual action of the seed disk: 20, a slide reciprocating across in front of each seed box: 21, a pawl carried by the slide and coöperating with ratchet teeth on the periphery of the seed disk, in a manner not unusual in this disk type of grain delivering mechanism: 22, a stop-pawl coöperating with the disk-teeth to prevent retreating movement of the disk under the dragging influence of the actuating pawl: 23, a pivoted chute disposed under the seed box, in position to receive grains falling from discharge hole 17, the lower end of this chute being normally spring-pressed against the forward portion of the spade structure so that grains falling to the chute are retained above it: 24, a plunger reciprocating vertically in the spades over the pivoted chute: 25, a pair of levers connecting cam actuated lever 15 with plunger 24 and slide 20 in such manner that when a cam 16 actuates the lever 15 it will bring about the descent of plunger 24 and also the advance of the seed disk to the extent of one tooth: and 26, a spring connected with lever 15 and tending to hold it in normal position with plunger 24 in upper position and pawl 21 in position of retreat, the action of cam 16 being to rock lever 15 and push the plunger downward and advance the disk.

To first dispose of the seed-delivering mechanism it may be said that, looking at Fig. 3, it is to be assumed that spade structure 13 is stabbed into the soil and there firmly anchored for the time being, a charge of grain being confined above the pivoted chute 23. If, now, while the spade structure and seed box are thus anchored stationary in the soil, the upper frame-work be carried forward, cam 16 will engage lever 15 and, in an obvious manner, bring about the descent of plunger 24 which will swing the pivoted chute rearwardly and permit the grain to fall therefrom, into the soil, the plunger acting aggressively and downward upon the grain if need be; the plunger later rising to normal idle position while the pivoted chute swings forward and receives and confines a new seed charge above it as the cam passes the actuating lever.

Giving consideration to Fig. 3, assume that the mechanism there shown is supported so that the frames may rotate free of the ground. It will be observed that all of the spades project downward and an analysis of the movement will show that, as the frames rotate, frame 10 rotates on axis 8 while frame 12 rotates on axis 9, the upper and lower axes of secondary bails 11 turning in their bearings in the frames, the bails, however, always remaining vertical. Now, assume that the lower spade is anchored in the soil and that all the other parts move forward to the left, as is the case as the machine moves over the field. Frame 10, in moving forward, returns on axis 8 and at the same time rocks forward on the upper axis of the lowermost bail as a pivot, axis 8 and, indeed, the entire upper portion of the apparatus moving downward in an arc in the course of the forward travel. At the same time the frame 12 is turning on axis 9 and is rocking forward and downward on the lower axis of the lowermost bail as a pivot, it being this conjoint action of the two frames that maintains the three upper spade structures with the blades vertical. It will be understood that it is early in this forward downward movement of the frames that the lower cam 16 attacks the lower seed lever 15 and brings about the dropping of the seed into the soil under the lowermost seed box, as has been explained.

In the course of the forward and downward movement of the frames the lefthand spade will eventually reach the soil and be stabbed down into it. This spade becoming a second anchor established in the soil and, obviously, a definite and certain distance from the first one. No seed is dropped by the second spade for the simple reason that this spade is not provided with seeding mechanism, this second spade being too close to the first one to be consistent with ordinary practical distance between seed dropping points. If the distance between the two spades corresponded with the desired distance between seed dropping points then, of course, seed boxes would be provided upon all of the spades instead of upon the alternate ones. The second spade having become anchored in the soil, the continued advance of the implement causes the frames, which have reached their lowest limit of movement, to rock forward and upward, the upper and lower axes of the bail of the second spade forming the pivots on which this new rocking motion takes place. The result of this new rocking motion of the frames is that all parts, except the new spade, rise, the effect being that the box-provided spade is pulled up out of the soil. Eventually all parts but the new spade will reach their highest position, after which they will move forward and downward and, in course of time, the box-provided spade appearing at the top in Fig. 3, will reach and be stabbed into the soil and deliver seed thereto, the distance between the two seed dropping points being represented by the distance between the first box-provided spade and the second spade plus the distance between the second spade and the second box-provided spade. In this way, as the machine moves over the ground, the boxes deliver seed at accurately measured distances, and the distance may, of course, be regulated in the construction of the machine, and an analysis of the principle of action will show that it would be permissible to have a greater or less number of spades than four, and a greater or less number of seed boxes than is represented by placing boxes on the alternate spades.

It will be readily understood that my invention lends itself to many modifications in details. At present I have contented myself with an explanation of the principle of my invention and have set forth merely the best form in which I at present contemplate embodying my principle.

I claim:—

1. A check row seeder or planter comprising a drag-frame capable of rising and falling motion, an upper pivot and a lower pivot carried thereby with their axes at right angles to the dragging movement of said frame, a main frame mounted for rotation on said upper pivot and carrying in its outer portions a circular series of pivot-bearings, a secondary frame mounted upon said lower pivot and carrying in its outer portions a pivot-bearing below each of the outer pivot-bearings in the main frame, a spade disposed at each outer pivot-bearing of the secondary frame and provided with downwardly presenting blades, a pivotal connection between each spade and the appropriate contiguous outer pivot-bearings in the main and secondary frames, and a seed-dropping device operatively connected with the rotating frames, combined substantially as set forth.

2. A check row seeder or planter comprising a drag-frame capable of rising and falling motion, an upper pivot and a lower pivot carried thereby with their axes at right angles to the dragging movement of said frame, a main frame mounted for rotation on said upper pivot and carrying in its outer portions a circular series of pivot-bearings, a secondary frame mounted upon said lower pivot and carrying in its outer portions a pivot-bearing below each of the outer pivot-bearings in the main frame, a spade disposed at each outer pivot-bearing of the secondary frame and provided with downwardly presenting blades, a pivotal connection between each spade and the appropriate outer pivot-bearings in the main and secondary frames, and a plurality of seed-dropping devices operatively connected with the rotating frames, combined substantially as set forth.

3. A check row seeder or planter comprising a drag-frame capable of rising and falling motion, an upper pivot and a lower pivot carried thereby with their axes at right angles to the dragging movement of said frame, a main frame mounted for rotation on said upper pivot and carrying in its outer portions a circular series of pivot-bearings, a secondary frame mounted upon said lower pivot and carrying in its outer portions a pivot-bearing below each of the outer pivot-bearings in the main frame, a spade disposed at each outer pivot-bearing of the secondary frame and provided with downwardly presenting blades, a pivotal connection between each spade and the appropriate contiguous outer pivot-bearings in the main and secondary frames, and a seed-dropping device carried by one of said spades and operatively connected with the rotating frames, combined substantially as set forth.

4. A check row seeder or planter comprising a drag-frame capable of rising and falling motion, an upper pivot and a lower pivot carried thereby with their axes at right angles to the dragging movement of said frame, a main frame mounted for rotation on said upper pivot and carrying in its outer portions a circular series of pivot-bearings, a secondary frame mounted upon said lower pivot and carrying in its outer portions a pivot-bearing below each of the outer pivot-bearings in the main frame, a spade disposed at each outer pivot-bearing of the secondary frame and provided with downwardly presenting blades, a pivotal connection between each spade and the appropriate contiguous outer pivot-bearings in the main and secondary frames, and seed-dropping devices carried by a plurality of said spades and operatively connected with the rotating frames, combined substantially as set forth.

5. A check row seeder or planter comprising a drag-frame capable of rising and falling motion, an upper pivot and a lower pivot carried thereby with their axes at right angles to the dragging movement of said frame, a main frame mounted for rotation on said upper pivot and carrying in its outer portions in circular series an even number of pivot-bearings, a secondary frame mounted upon said lower pivot and carrying in its outer portions a pivot-bearing below each of the outer pivot-bearings in the main frame, a spade disposed at each outer pivot-bearing of the secondary frame and provided with downwardly presenting blades, a pivotal connection between each spade and the appropriate contiguous outer pivot-bearings in the main and secondary frames, and seed-dropping devices carried by the alternate spades and operatively connected with the rotating frames, combined substantially as set forth.

6. A check row seeder or planter comprising a drag-frame capable of rising and falling motion, an upper pivot and a lower pivot carried thereby with their axes at right angles to the dragging movement of said frame, a main frame mounted for rotation on said upper pivot and carrying in its outer portions a circular series of pivot-bearings, a secondary frame mounted upon said lower pivot and carrying in its outer portions a pivot-bearing below each of the outer pivot-bearings in the main frame, a spade disposed at each outer pivot-bearing of the secondary frame and provided with downwardly presenting blades, a pivotal connection between each spade and the appropriate contiguous outer pivot-bearings in the main and secondary frames, a seed-box carried by one of the spades, seed-dropping mechanism therein, an actuating lever forming a part of the seed dropping mechanism, and a cam carried by the rotating frames and adapted for coöperation with said lever, combined substantially as set forth.

7. A check row seeder or planter comprising a pair of drag-bars capable of rising and falling motion, a bail carried thereby and forming upper and lower pivots with their axes at right angles to the dragging movement of said bars, a pair of main frames mounted for rotation on the upper member of said bail and carrying in their outer portions a circular series of pivot-bearings, a pair of secondary frames mounted upon the lower member of said bail and carrying a pivot-bearing below each of the outer pivot-bearings in the main frames, bails disposed at the outer portions of the frames and having their upper members pivoted in the pivot-bearings of the main frames and their lower members pivoted in the pivot-bearings of the secondary frames, a spade rigidly secured to the lower member of each outer bail and provided with a downwardly presenting blade, a seed-box carried by one of the spades and provided with seed dropping mechanism, and operative connections between said frames and seed-dropping mechanism for actuating the seed-dropping mechanism while the seed-box is stationary and the frames are in motion, combined substantially as set forth.

8. A check row seeder or planter comprising a vehicle frame, carrying wheels therefor, a pivot carried by said frame with its axis parallel with the axis of said wheels, a pair of drag-bars mounted on said pivot at each side of the center of width of said frame, a central bail rigidly carried by each pair of drag-bars and forming upper and lower pivots, a pair of main frames mounted for rotation on the upper member of each bail and carrying a circular series of pivot-bearings in their outer portions, outer bails having their upper members pivoted in the outer pivot-bearings of the main frames, spades rigidly connected with the lower members of the outer bails and provided with downwardly presenting blades, a pair of secondary frames mounted for rotation on the lower member of each central bail and having their outer portions pivoted to the lower members of the outer bails, and a pair of seed-dropping devices appropriate to each pair of drag bars and operatively connected with the rotating frames thereof, combined substantially as set forth.

WILLIAM H. ALBERT.

Witnesses:
 A. H. RASLIER,
 MARY ALBERT.